United States Patent [19]
Quigley et al.

[11] Patent Number: 5,888,601
[45] Date of Patent: Mar. 30, 1999

[54] COMPOSITE TUBULAR MEMBER HAVING CONSISTENT STRENGTH

[75] Inventors: Peter A. Quigley, Pocasset; Stephen C. Nolet, Franklin, both of Mass.

[73] Assignee: Composite Development Corporation, West Wareham, Mass.

[21] Appl. No.: 680,349

[22] Filed: Jul. 15, 1996

Related U.S. Application Data

[63] Continuation-in-part of Ser. No. 178,664, Jan. 7, 1994, Pat. No. 5,556,677, Ser. No. 191,856, Feb. 3, 1994, Pat. No. 5,549,947, Ser. No. 597,088, Feb. 5, 1996, Pat. No. 5,688,571, and Ser. No. 680,349, Jul. 15, 1996, Pat. No. 5,888,601.

[51] Int. Cl.$^6$ .................................................. B29D 22/00
[52] U.S. Cl. ..................... 428/36.1; 428/36.3; 428/36.91; 428/408; 428/902
[58] Field of Search ................................. 428/36.3, 36.1, 428/36.91, 408, 902

[56] References Cited

U.S. PATENT DOCUMENTS

Re. 29,112  1/1977  Carter .
Re. 30,489  1/1981  Abbott .

(List continued on next page.)

FOREIGN PATENT DOCUMENTS

| 2105797 | 11/1993 | Canada . |
| 0 470 896 A2 | 2/1992 | European Pat. Off. . |
| 2219289 | 9/1974 | France . |
| 2 501 579 | 8/1982 | France . |
| 2 516 859 | 5/1983 | France . |
| 1 704 925 | 7/1971 | Germany . |

OTHER PUBLICATIONS

European Search Report mailed Oct. 2, 1995.
International Search Report, dated 10 Sep. 1995.
"TPI Tips", News and Tips for Pultruded Thermoplastic Composites, Thermoplastic Pultrusions, Inc. V.2–No.4, Jul. 1992 (1 Page).
"TPI Tips", News and Tips for Pultruded Thermoplastic Composites, Thermoplastic Pultrusions, Inc. V.2–No.5, Sep. 1992 (1 page).
Thermoplastic Pultrusions, Inc. publication, not dated, citing New Developments (8 pages).
European Search Report dated Jan. 28, 1993, application no. EP 90 91 1104.
"A New Generation of High–Strength Engineered, Composite Structural Shapes", The technology exists today at Alcoa/Goldsworthy Engineering, ALCOA Goldsworthy Engineering.
"TPI Tips", News and Tips for Pultruded Thermoplastic Composites, Thermoplastic Pultrusions, Inc. V.1–No.2, Nov. 1991 (1 page).
"TPI Tips", News and Tips for Pultruded Thermoplastic Composites, Thermoplastic Pultrusions, Inc. V.2–No.3, May 1992 (1 page).
"Tygon Tubing", Bulletin T–104, Norton Performance Plastics, Akron, Ohio.
R. Monks, "Two Trends in Composites", Plastics Technology, pp. 40–45, Mar. 1992.
"Advanced Production Systems for Composites", The Shape of Things to Come, Goldsworthy Engineering, Inc.

*Primary Examiner*—James J. Bell
*Attorney, Agent, or Firm*—Lahive & Cockfield, LLP

[57] ABSTRACT

An axially extending tubular composite member having a plurality of plies and extending along a longitudinal axis has at least three plies with selectively structured fiber components in each ply. Typically an inner ply has at least one biaxial fiber component, an intermediate ply has at least an axial fiber component that typically is combined with two further fibers to form a triaxial fiber component. Another ply typically has a woven fiber component. A further ply having a biaxial component either replaces the ply of woven fiber or is disposed beneath it over the intermediate ply. A surface veil having fiber and an excess of resin material typically covers at least the innermost or outermost surface of the composite member. An internal web member can be provided, and typically also employs fibers and the matrix material.

17 Claims, 7 Drawing Sheets

U.S. PATENT DOCUMENTS

| | | |
|---|---|---|
| 2,602,766 | 7/1952 | Francis . |
| 3,007,497 | 11/1961 | Shobert . |
| 3,080,893 | 3/1963 | Craycraft ............................ 138/141 |
| 3,256,125 | 6/1966 | Tyler . |
| 3,489,636 | 1/1970 | Wilson . |
| 3,561,493 | 2/1971 | Maillard et al. . |
| 3,762,986 | 10/1973 | Bhuta et al. . |
| 4,023,801 | 5/1977 | VanAuken . |
| 4,171,626 | 10/1979 | Yates et al. . |
| 4,248,062 | 2/1981 | McLain et al. . |
| 4,268,561 | 5/1981 | Thompson et al. . |
| 4,612,241 | 9/1986 | Howard, Jr. . |
| 4,625,671 | 12/1986 | Nishimura . |
| 4,657,795 | 4/1987 | Foret . |
| 4,668,318 | 5/1987 | Piccoli et al. . |
| 4,699,178 | 10/1987 | Washkewicz et al. . |
| 4,716,072 | 12/1987 | Kim . |
| 4,759,147 | 7/1988 | Pirazzini . |
| 4,791,965 | 12/1988 | Wynn . |
| 4,840,846 | 6/1989 | Ejima et al. . |
| 4,900,048 | 2/1990 | Derujinsky . |
| 4,968,545 | 11/1990 | Fellman et al. . |
| 5,048,441 | 9/1991 | Quigley . |
| 5,188,872 | 2/1993 | Quigley . |
| 5,332,606 | 7/1994 | Pearce . |

COMPOSITE TUBULAR MEMBER HAVING CONSISTENT STRENGTH

CROSS REFERENCE TO RELATED CASES

This application is a continuation-in-part of the following commonly-owned and non-provisional and provisional patent applications:

U.S. Ser. No. 08/178,664, filed Jan. 7, 1994, now U.S. Pat. No. 5,556,677,

U.S. Ser. No. 08/191,856, filed Feb. 3, 1994, now U.S. Pat. No. 5,549,947,

U.S. Ser. No. 08/680,349, filed Jul. 15, 1996, now U.S. Pat. No. 5,888,601, and

U.S. Ser. No. 08/597,088 filed Feb. 5, 1996 now U.S. Pat. No. 5,688,571.

BACKGROUND

This invention provides resin-fiber composite tubular members having unique combinations of fiber orientations in different plies, and having selected other reinforcement.

The composite members of the invention are advantageously used in various manufactured products, including sports implements such as golf clubs and hockey sticks among others.

Sports implements have long been made with various materials including wood and particularly wood shafts. Wood implements can have high strength as desired and can have a satisfying feel for the user. One drawback of wood, however, is significant variation from item to item, even when made to the same specifications and dimensions.

Among the known practices regarding fiber-reinforced resin tubular materials are the bicycle frame structure disclosed in U.S. Pat. No. 4,657,795 of Foret. Also in the prior art are U.S. Pat. Nos. 5,048,441; 5,188,872; and No. RE 35,081.

One object of this invention is to provide composite tubular members suited for the shaft of a sports implement. Other objects of the invention will in part be obvious and will in part appear hereinafter.

SUMMARY OF THE INVENTION

The tubular members which the invention provides have resin-fiber composite construction with improvements in durability and particularly in bending strength and in impact strength. Further, the tubular members are generally suited for relatively low cost manufacture.

The tubular members of the invention have one or more plies of fibers. In one practice, the multiple-ply composite members are constructed according to manufacture methods commonly-assigned U.S. patent application Ser. No. 08/191, 856 filed 3 Feb. 1994 and incorporated herein by this reference.

Typically, an axially extending tubular composite member according to the invention has a plurality of plies. At least some plies include substantially continuous fibers. The composite member has a primary bending stiffness along a longitudinal axis.

The tubular composite member generally has at least three plies, including an inner or interior ply that commonly has at least one biaxial fiber component embedded in the matrix material. As used herein a biaxially fiber component includes two sets of fibers or threads spirally wrapping in opposite directions about the axially extending composite member. The two sets of fibers thus are generally symmetrical and generally extend diagonally relative to the axis of the member.

An intermediate ply of the composite member typically has at least one axially extending fiber component also disposed with the resin or other matrix material. The intermediate ply is disposed contiguously over the interior ply and hence is exterior to the interior ply. The axial fiber component of the intermediate ply can be a substantially continuous set of fibers extending essentially parallel to the elongation axis of the composite member. Alternatively, a set of axially extending fibers can follow a helical path, i.e., extend at an acute angle relative to the elongation axis. In one practice the axial fiber is interlaced with two other sets of threads or fibers extending symmetrically in opposite directions relative to the axial fiber, to constitute so-called triaxial fiber structure. The interlacing or diagonally extending sets of fibers enhance maintaining the axially extending fibers in place and they add strength, including preventing cracks and other stress failures or fractures from propagating.

In one practice of the invention a further ply overlying the intermediate ply has a woven fiber component. In a typical embodiment, the woven fiber component has the two sets of fibers, and one is oriented axially and the other transversely relative to the longitudinal axis, i.e., a so-called 0° and 90° fiber orientation relative to the elongation axis.

A further practice of the invention employs an outer ply having at least one biaxial fiber component and located over the intermediate ply and either in place of a woven fiber component as described above or beneath such a woven fiber component.

Aside from applying fiber components in woven form, they can be formed with continuous fiber strands drawn from spools as described in Attachment A. Alternatives include applying the fibers in preformed fibrous sheets. Furthermore, the fibers can be braided, stitched or knitted.

It is also to be understood that each ply can include two or more subplies. By way of example, the inner ply of a tubular member according to the invention can have two subplies, each with a biaxial fiber component. In a further example, the biaxial fibers can have different fiber angles, relative to the elongation axis, in the two subplies.

A typical further element of a composite member according to the invention is a surface veil, forming either the extreme outer surface of the member or the extreme tubular inner surface, or both. Such a surface veil can facilitate the manufacture of the member, particularly in a pultrusion manufacture. An exterior veil can enhance appearance, an interior veil can improve impact resistance. As is known in the art, a surface veil for these purposes has a relatively large proportion of resin and a relatively lesser fiber component.

The fibers of a composite member according to the invention are generally selected, using known criteria, from materials including carbon, aramid, glass, linear polyethylene, polyethylene, polyester, and mixtures thereof.

The matrix material is selected from a group of resin-based materials, such as thermoplastics and thermosets. Examples of thermoplastics include: polyetherether-ketone, polyphenylene sulfide, polyethylene, polypropylene, and Nylon-6. Examples of thermosets include: urethanes, epoxy, vinylester, and polyester.

In a further practice of the invention, tubular members having a resin-fiber composite structure have improvements in durability and particularly in impact strength, and yet retain light weight, when constructed with one or more additional structural elements. Such structural elements which the invention provides include selectively concave walls, selected added thickness at corners of walls, added thickness selectively in each of two opposed walls, and internal reinforcement.

The first three features stated above, i.e., concave walls, thickened corners, and thickened walls, are applicable to members having a non-circular cross section and typically to members having a polygonal cross-section. A preferred polygonal cross-section has four or more sides.

The foregoing structural features preferably are used in combination with one another, such as opposed concave walls combined with added wall thickness at the corners of those walls, or added thickness at opposed walls and added thickness at the corners of those walls.

The internal reinforcement is applicable in structures having any of various cross sections, examples of which include a polygonal cross section and a circular cross section. Examples of such reinforcement include an interior rib extending along at least a portion of the length of the member, either essentially parallel to the axis or length of the member or selectively angled, e.g., helical, with regard to the axis of a straight member. Such a rib is preferably provided on each of two opposed walls. Another example of such internal reinforcement is an interior web, or an axially spaced succession of interior braces, spanning between opposed walls or between adjacent walls. For example, an interior web or brace in a composite tubular member according to one embodiment of the invention and having a circular or elliptical cross section can follow the path of a chord extending between two locations spaced apart around the circumference of the composite member, when viewed in cross section. Correspondingly, in a structure having a polygonal cross section, the internal web or brace extends between adjacent walls. Further examples include such braces or webs extending between opposed walls or wall portions, including along the path of a diameter of a member having a circular or elliptical cross section.

The interior reinforcement can extend along the full length of the member or along only part of the length. The latter may be preferred, for example, to decrease weight and to control stiffness.

In one preferred practice, the internal reinforcement is formed during the initial pultrusion fabrication of the composite member and accordingly is continuous along the length of the member, or at least along a selected portion thereof. Where such an internal reinforcing web is formed continuously along the length of a member, it can subsequently be removed, as by machining, from one or more selected portions of the length of the member. This may be desired to reduce the weight of the member.

A further alternative is to fabricate the composite member and add internal reinforcement, by inserting a preformed internal reinforcement element. The internal reinforcement element preferably is added prior to final curing of the polymers of the composite member and of the reinforcement element to ensure a solid attachment of the internal reinforcement member element to the composite member. In accordance with another method of fabrication, the composite member and the internal reinforcing element are formed concurrently as part of a resin transfer or compression molding process. This fabrication method provides a system capable of forming a composite member integral with an internal reinforcing element, both having selective characteristics along the length of the member.

The invention accordingly comprises an article of manufacture possessing features, properties and relations of elements exemplified in the articles hereinafter described, and comprises the several steps and the relation of one or more of such steps with respect to each of the others for fabricating such articles, and the scope of the invention is indicated in the claims.

BRIEF DESCRIPTION OF THE DRAWING

For a fuller understanding of the nature and objects of the invention, reference is to be made to the following detailed description and the accompanying drawing, in which.

DESCRIPTION OF ILLUSTRATED EMBODIMENTS

Figure 1:
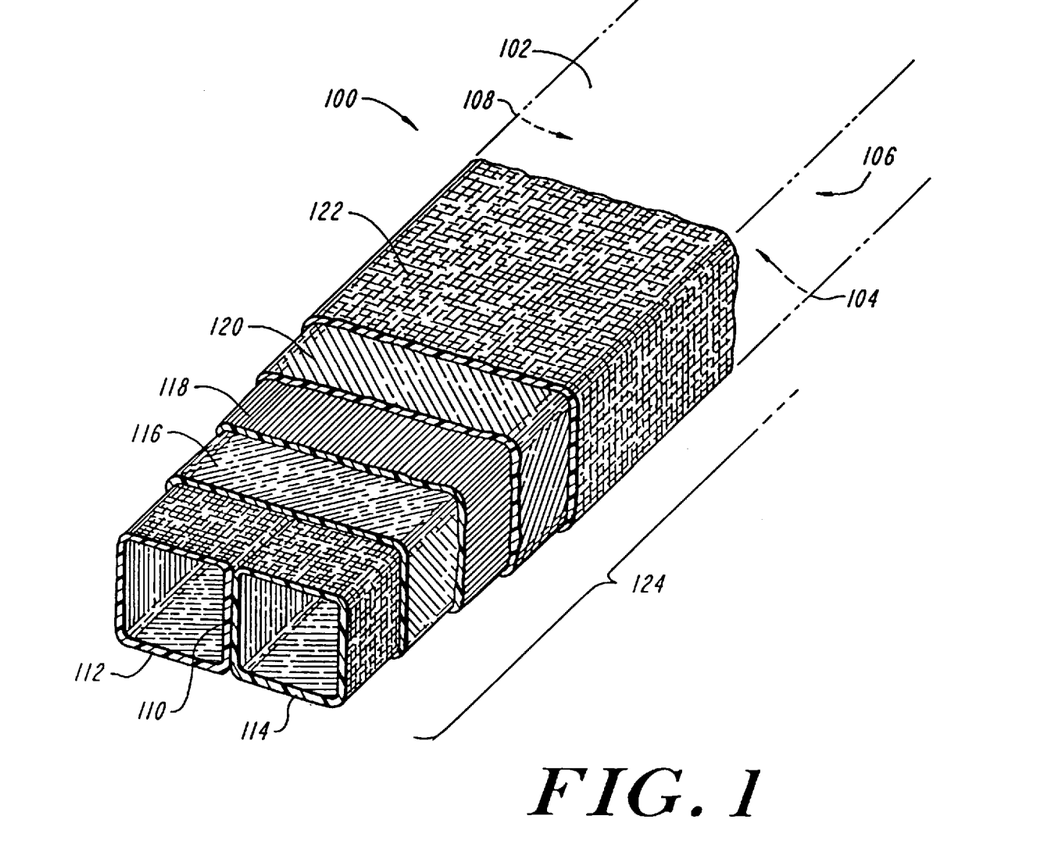
FIG. 1 shows a transverse cross-section and longitudinal fragment of a composite tubular member according to one practice of the invention.

FIG. 1 shows a transverse cross section and longitudinal fragment of a composite tubular member 100 according to one preferred practice of the invention. The illustrated member 100 has a rectangular cross section with two wide opposed walls 102 and 104 and two narrow opposed walls 106 and 108. The tubular member 100 can be constructed essentially as described in U.S. Pat. No. 5,549,997 to form, for example, the shaft of a hockey stick or of a lacrosse stick. Each wall 102, 104, 106 and 108 of the illustrated member 100 has generally uniform thickness along the length of the member and the four walls are of essentially the same thickness. Thus, the illustrated member 100 is preferably continuous along at least a selected length, i.e., has the same cross section at successive locations along that selected length. This continuous cross sectional configuration facilitates manufacture, for example with pultrusion procedures as described in U.S. Pat. No. 5,549,947 .

The member 100 further has, as also shown in FIG. 1, internal reinforcement in the form of a web 110 that spans between and is joined solidly to the opposed wider walls 102 and 104 of the member. The reinforcing web 110 is continuous along at least a selected portion of the length of the member 100. The illustrated member 100 thus has a hollow tubular interior within the walls 102–108, aside from the web 110.

In a preferred embodiment of the member 100, as shown, two elongated strips of fabric 112 and 114 are formed into side-by-side closed quadrilateral tubes. The abutting walls of the two tubes, as formed by the fabric, form the web 110 of the member 100.

An elongated strip of fabric 116 is then formed into a closed tube enclosing the two side-by-side tubes formed by the fabrics 112 and 114.

A ply 118 of axially-extending fibers is then disposed over the layer formed by the fabric 116.

Another elongated strip of fabric 120 is formed into a closed tube enclosing the fiber ply 118 (and the structure therein formed by the fabrics 116, 114 and 112). An outer ply of the structural member is formed by an elongated strip of fabric 122, also formed into a tubular enclosure.

The foregoing assemblage of fiber plies is impregnated with resin 124, typically an epoxy resin, and the resultant composite is cured.

The foregoing procedure of fabricating the member 100 can advantageously be practiced in a pultrusion system with a fixed, i.e., stationary, mandrel on which the fabric and fiber layers are formed, and within an outer die-like forming member.

In one preferred embodiment of the member 100, each fabric 112 and 114 is a preformed fabric having fibers, typically of fiberglass, carbon or aramid, and oriented at zero degrees and at ninety degrees relative to the longitudinal length of the member 100. Such a fabric commonly has a woven structure.

The fabric 116 in this embodiment is a preformed fabric, preferably non-woven, i.e., of stitched or knitted structure, with fibers oriented at ±forty-five degrees relative to the longitudinal axis of the member 100. Alternatively, braided or woven fabrics oriented at ±forty-five degrees relative to the longitudinal axis of the member I 00 may be used. Such a fabric 116 thus forms an inner ply of the member 100 and which has a biaxial fiber component. The fabrics 112 and 114, which are within the ply formed by the fabric 116, form another inner ply of the member 100. The illustrated member 100 thus has an inner ply having two subplies, one formed by the fabric 116 and another formed by the fabric 112 and 114. The fabric 116 can be, for example, of glass, carbon or aramid fibers.

The fibers in the ply 118 can be of carbon or of glass, or can be a hybrid, i.e., a combination of glass and of carbon, by way of example. These fibers form the ply 118 as an intermediate ply in the member 100 and with at least an axial fiber component.

The fabric 120 in the illustrated embodiment is a preformed fabric of glass and/or carbon, preferably of non-woven structure and having fibers oriented at ±forty-five degrees relative to the member longitudinal axis. This fabric thus forms an outer ply of the member 100 and which also has a biaxial fiber component.

The fabric 122 that forms the illustrated outer ply of the member 100 is preferably a preformed fabric typically of woven structure, with fibers oriented at zero and at ninety degrees relative to the longitudinal axis of the member 100. This fabric 122 forms an exterior ply of the member, external to the outer ply formed with the fabric 120.

The primary function of each layer in the member 100 is that the innermost fabrics 112 and 114 provide internal impact resistance, particularly by forming the internal reinforcing web 110. Each fabric 116 and fabric 118 forms a ply providing torsional stiffness to the member 100. The axially-oriented fibers in the ply 118 provide bending load strength, i.e., axial stiffness to the member 100. The fabric 122 provides external wear resistance to the member 100.

The member 100 can be further formed, prior to curing, with one or more light gauze or surface veil plies 126 of preformed gauze or veil-like fiber that is highly resin-absorbent. These surface gauze or veil plies enhance the abrasion resistance of the member 100 and can provide an attractive surface finish.

More generally, the invention can be practiced, in one instance, with fibers oriented at angles other than those for the particular embodiment described above. For example, the fabrics 112 and 114 can be arranged with the fibers oriented generally between ±30° and between 60° and 120° relative to the longitudinal axis of the member 100. More preferred ranges of fiber angles for these fabrics are ±15° and between 75° and 115° relative to that axis.

Similarly, each fabric 116 and 120 can be arranged with fibers oriented between ±30° and ±60° relative to the longitudinal axis of the member 100. More preferred ranges of the fiber angles for each of these fabrics are between ±40° and ±50°. Further, in most practices of the invention, the two sets of fibers of each fabric—which generally are orthogonal to each other within the fabric—are oriented on the member symmetrically relative to the longitudinal axis of the member.

The longitudinal seams of the different strips of fabric that form the several plies of the member 100, as described above, are preferably formed at different, spaced apart locations in the member 100. For example, the longitudinal seams in the tubes formed by the fabrics 112 and 114 can be disposed along opposed member walls 106 and 108. The longitudinal seams of the fabrics 116, 120 and 122 can also be located along different walls of the member 100.

Features attained with a composite member having the structure described and shown are that it has high bending strength and stiffness, and high torsional rigidity. It also has, through the wall thickness, durability and impact resistance. Further by way of illustrative example and without limitation, a member 100 as described above and shown in FIG. 1 and suited for use as a hockey stick shaft can have a web thickness of 0.034 inch and a thickness in each wall 102, 104, 106 and 108 of 0.082 inch.

Figure 2:
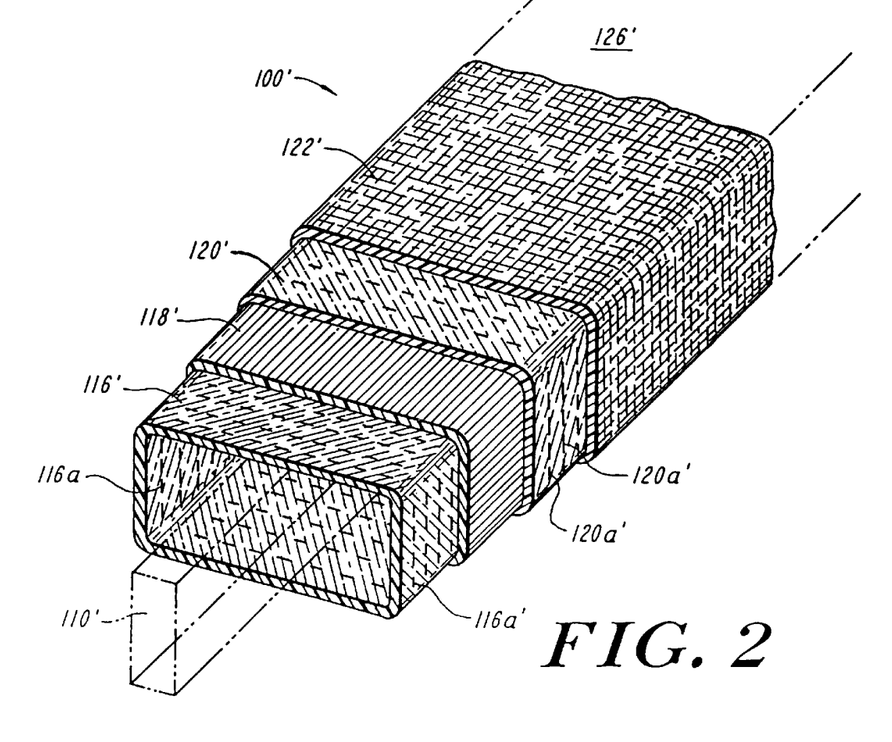
FIG. 2 shows a transverse cross-section and longitudinal fragment of a composite tubular member according to a further practice of the invention.

FIG. 2 shows another construction for a member 100', which illustratively has a quadralateral cross section transverse to an elongation axis, as shown. The member 100' has an inner ply 116' with a biaxial fiber component, an intermediate layer 118' with a triaxial fiber component, and an external ply 122' illustratively having a woven fiber component with a 0°/90° fiber orientation.

The illustrated member 100' also has an outer ply 120' interposed between the intermediate ply 118' and the external ply 122', and which illustratively also has a biaxial fiber component similar to the inner ply 116'. Further, each biaxial fiber component of the inner and outer plies 116' and 120' includes a stitching fiber 116A' and 118A'. The foregoing fiber components of the member 100' are embedded in a resin matrix that extends through all the plies to form the fiber components into a single unitary structure.

Although illustrated with a hollow reinforcement-free interior, the member 100' of FIG. 2 alternatively can have a reinforcing rib 110' as shown in phantom.

A surface veil 126' preferably is applied over the outer surface of the member 100', as FIG. 2 further shows.

Figure 3:
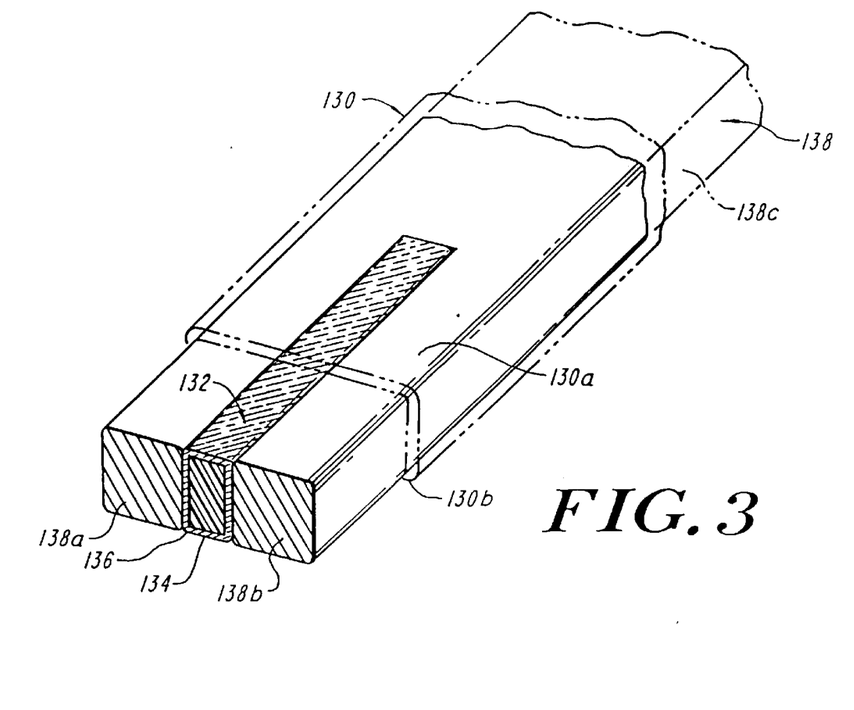
FIG. 3 shows a transverse cross-section and longitudinal fragment of a composite tubular member according to yet another practice of the invention.

Another elongated reinforced composite member 130, according to the invention and as shown in FIG. 3, has a web 132 secured to and spanning between opposed walls 130A and 130B. Alternatively, the web 132 can span between walls of the composite member 130, other than 130A and 130B. The illustrated web 132 has a core 134 enclosed within a fibrous sleeve 136. The core 134 can be of various materials depending on the weight and strength requirements, examples of which are wood and plastic, typically rigid, synthetic resin foam. The core 134 of the web 132 in other practices can be partially or entirely hollow and can alternatively employ a laminated structure with different layers, typically of wood and/or synthetic materials.

The fibrous sleeve 136 can be woven, braided or otherwise formed over the core 134. Another practice is to insert the core 134 into a preformed hose of fibrous material that constitutes the sleeve 136. In either case, the sleeve 136 can be formed of fiberglass, carbon, or kevlar, or a hybrid combination thereof.

FIG. 3 further shows that during illustrative fabrication of the member 130, the web 132 formed by the core 134 within the fibrous sleeve 136 is seated between two tines or side-by-side legs 138A and 138B of a mandrel 138 having an end portion 138C that joins together the two tines or legs.

The several fibrous plies that form the walls of the member 130 are then formed, in succession, over the mandrel 138 and thus are formed or built up onto the assembled core and sleeve, which are held in place between the tines of the mandrel onto which the walls are formed.

An innermost surface veil, with a fiber structure and excess resin, preferably is the first layer formed onto the mandrel 138, to facilitate the manufacture of the member 130 onto the mandrel 138. The mandrel is removed from the member 130, typically after all the plies are applied and before the end of the manufacturing process.

Figure 4:
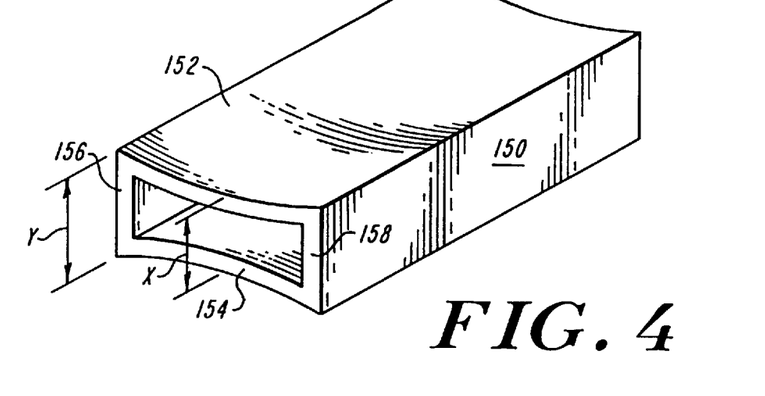
FIGS. 4 through 9 show transverse cross-section and longitudinal fragments of composite tubular members according to further practices of the invention and having selectively configured and reinforced wall portions.

FIG. 4 shows a transverse cross section and longitudinal fragment of a composite tubular member 150 having walls 152, 154, 156 and 158. The tubular member 150 can be constructed as described above with reference to FIGS. 1, 2, and 3, and as further described in Attachment A, to form, for example, the shaft of a hockey stick. Each wall 152 and 154 of the member, which together form a pair of opposed walls, is concave. The concavity of the opposed walls preferably is symmetrical, as shown.

One preferred construction of the member 150 has a magnitude of concavity of the opposed walls 152 and 154 such that the minimum width of the shaft at the mid-point of the concavity, designated in FIG. 4 as (X), is less than the maximum width of the shaft, designated as (Y), by the equation $y \geq 1.01 \ x$ (Eq. 1)

Figure 5:
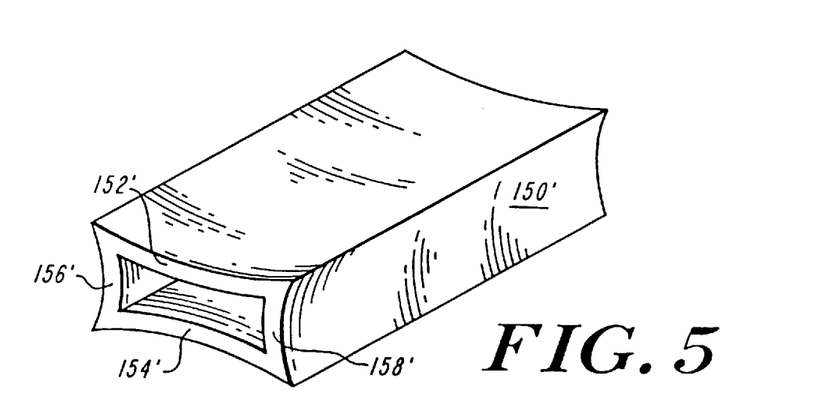

FIG. 5 illustrates another form of the quadrilateral composite member 152' in which both pairs of opposed walls 152' and 154' and 156' and 158' are concave. The preferred magnitude of concavity of each pair of opposed walls is in accord with equation (1). The concavity of the opposed walls 152' and 154' is preferably symmetrical, as is the concavity of the opposed walls 156' and 158'.

Figure 6:
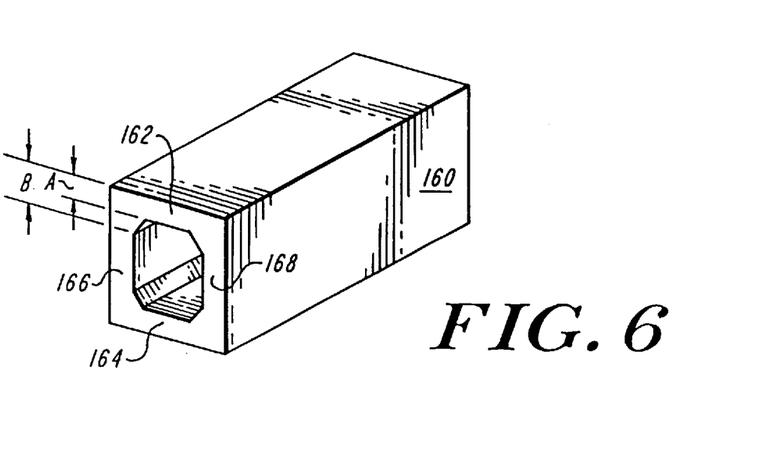

FIG. 6 shows a longitudinal fragment of a composite member 160, such as a hockey stick shaft or a lacrosse stick shaft, having a rectangular cross section with top and bottom walls 162 and 164 thicker than side walls 166 and 168. This configuration is typical in a hockey stick shaft. Each wall 162, 164, 166 and 168 of the illustrated member 160 has uniform thickness, in the cross section shown in FIG. 6, except at the corner where it joins another wall. In the illustrated composite member 160, the outer periphery of the four walls has a right rectangular cross section, and the periphery of the inner surfaces is similar but with corners beveled at approximately 45° angles or with the inner surfaces of the corners having a radius to create the desired increased thickness in the corner. One preferred magnitude of the difference in wall thickness is in accord with Equation 2 below, where the dimension (A) is the minimal thickness of a wall, e.g., at its midpoint, and the dimension (B) is the thickness of that wall as measured in the same direction, at one corner thereof.

$B \geq 1.05 \ A$ (Eq. 2)

Figures 7, 8:
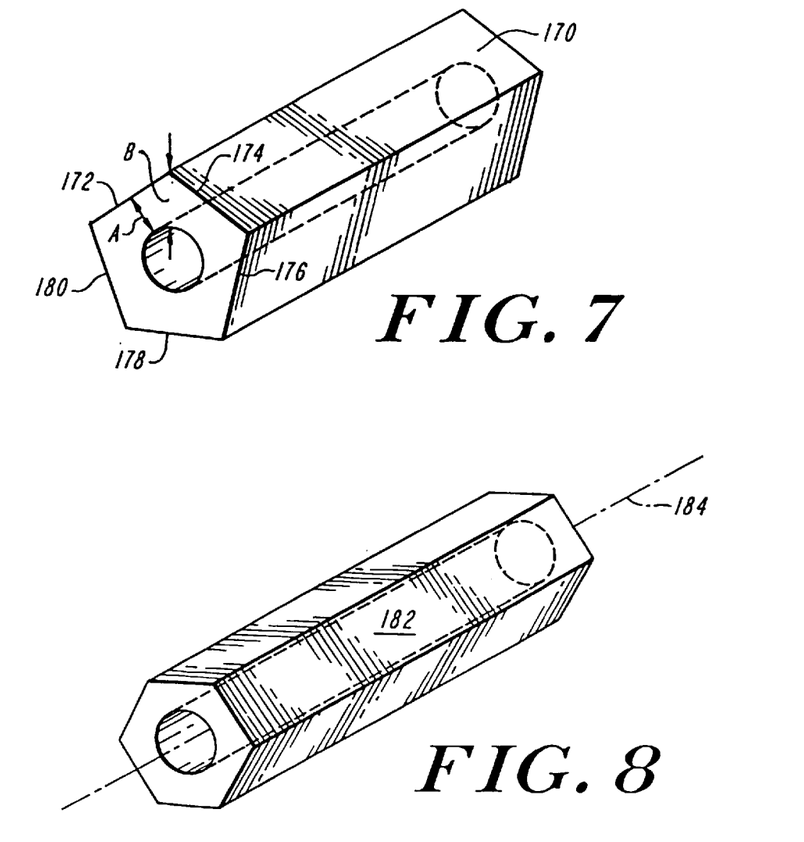

A composite member 170 having five equal-width walls 172, 174, 176, 178 and 180, i.e., which is pentagonal in a cross section transverse to the length as shown in FIG. 7, has a maximal wall thickness in each wall at the corners, similar to the construction of the member 160 of FIG. 6. The illustrated structure of the composite member 170 is regular, in that all walls and all corners are the same as others, and all included angles of the pentagonal cross section are equal. The maximal wall thickness at a corner, designated (B), is greater than the minimal wall thickness, designated (A), and the two thicknesses of each wall preferably are in accord with Equation (2).

FIG. 8 shows a structure 182 similar to the member 170 of FIG. 7, except that it has a hexagonal cross section, as illustrative of the shaft of a lacrosse stick. The member is elongated along an axis 184, as are the members shown in other figures.

Figure 9:
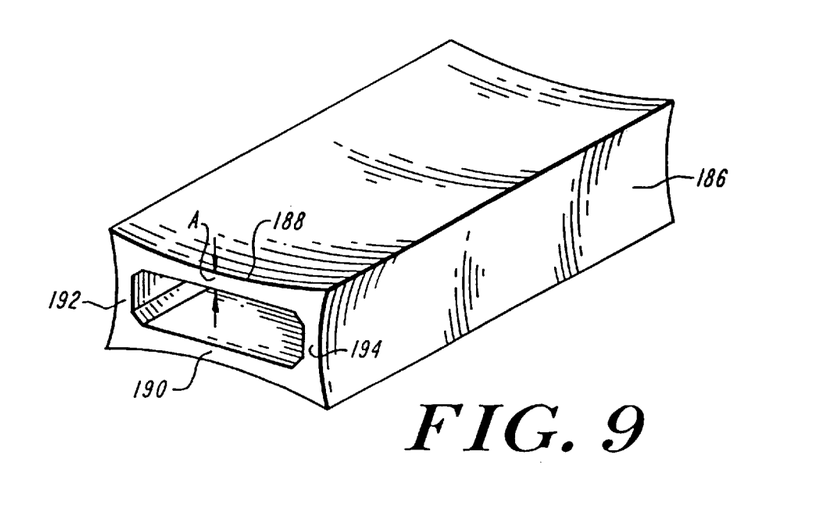

FIG. 9 shows a composite member 186 having multiple features in accord with the invention. In particular, the illustrated member 186 has concave walls and each wall 188 and 190 in one pair of opposed walls has a greater thickness than in the other pair of opposed walls 192 and 194. The member 186 has a third feature, namely that the walls have added thickness at corners. Each wall of the illustrated member 186 has uniform thickness along the width of the wall, except at each corner, where the wall thickness is larger. The increased wall thickness at each corner preferably is in accord with Equation 2, which relates minimum thickness of a wall (A) to the maximal thickness (B) of that wall.

In accordance with one aspect, each member 150, 160, 170, 182 and 186, shown in FIGS. 4, 5, 6, 7, 8 and 9 respectively, is preferably continuous along at least a selected length, i.e., has the same cross section at successive locations along that selected length. This continuous cross sectional configuration facilitates manufacture, for example, with pultrusion procedures as described in Attachment A. The different wall thicknesses at different locations circumferentially about the cross section of each member 150, 160, 170, 182 and 186 can be attained with added resin, and can be attained with a combination of added resin and added fibers, typically axial, i.e., longitudinal.

In another aspect of the invention, each member 150, 160, 170, 182 and 184, has a varying cross-sectional geometry along the length of the composite member. Such members having a varying cross-section can be produced with a molding process. These members with varying geometry advantageously provide a higher performance tubular member having, as compared to those members produced by a pultrusion process, an increased strength per weight ratio.

FIGS. 10, 11, 12 and 13 illustrate, respectively, composite members 200, 202, 204 and 206, each of which incorporates internal reinforcement. For clarity of illustration, each composite member 200–206 is illustrated with uniform thickness throughout the walls including corners. However, the internal reinforcement shown and described below preferably is combined with one or more of the structural features described above with reference to FIGS. 4 through 9.

Figure 10:
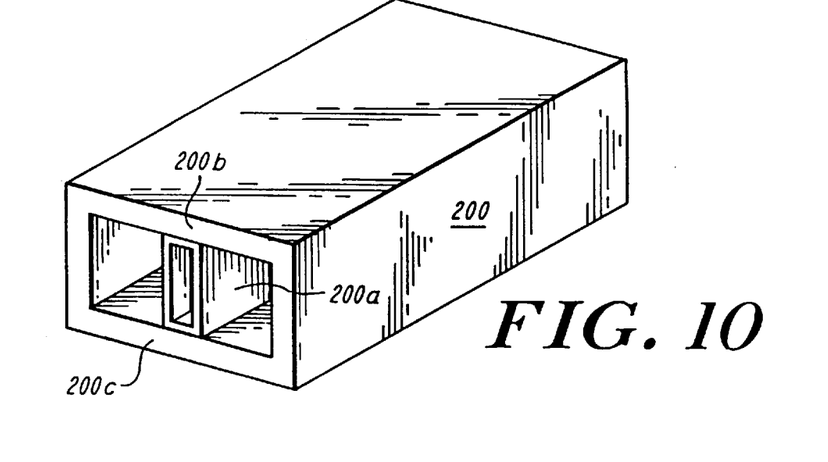
FIGS. 10 through 15 show transverse cross-section and longitudinal fragments of composite tubular members according to further practices of the invention and having internal reinforcement.

The internal reinforcement of member 200 in FIG. 10 is a tube 200a that spans between and is joined solidly to opposed walls 200b and 200c of the member. The reinforcing tube 200a is continuous along at least a selected portion of the length of the member 200.

Figure 11:
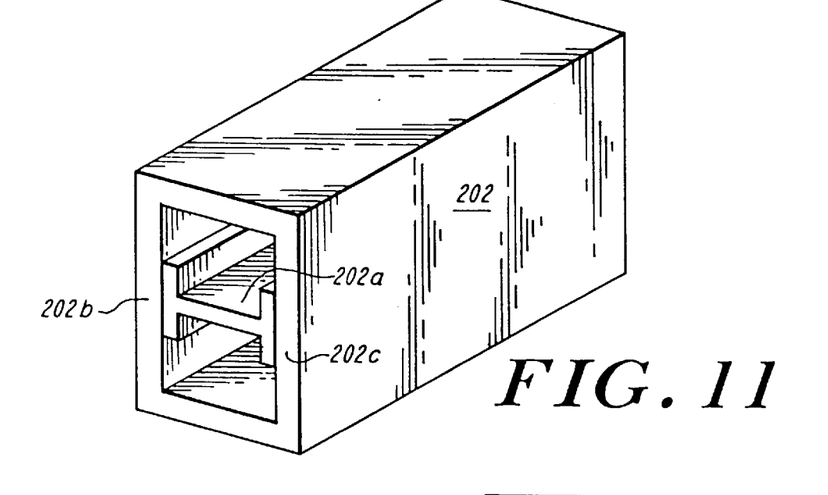

The member 202 of FIG. 11 has an internal reinforcing web 202a joined to and spanning between a pair of opposed walls 202b and 202c of the member. These are illustrated as the wider walls of the member and the web 202a is preferably continuous along at least a selected length of the member 202. The reinforcing web 202a is secured within the member 202 after each such element has been initially formed. The web 202a typically has the cross section of an I beam, as illustrated. In other practices of the invention, the web 202a is formed during the formation of the member 202, as in a pultrusion or a molding fabrication, and hence is formed integrally with the walls 202b and 202c; the thickness of those walls can be increased slightly adjacent the juncture with the web 202a, to form structure corresponding to the flanges on a conventional I beam. The structures described above with reference to FIGS. 1, 2 and 3 are further alternatives for attaining the member 202 with the web 202a.

Figure 12:
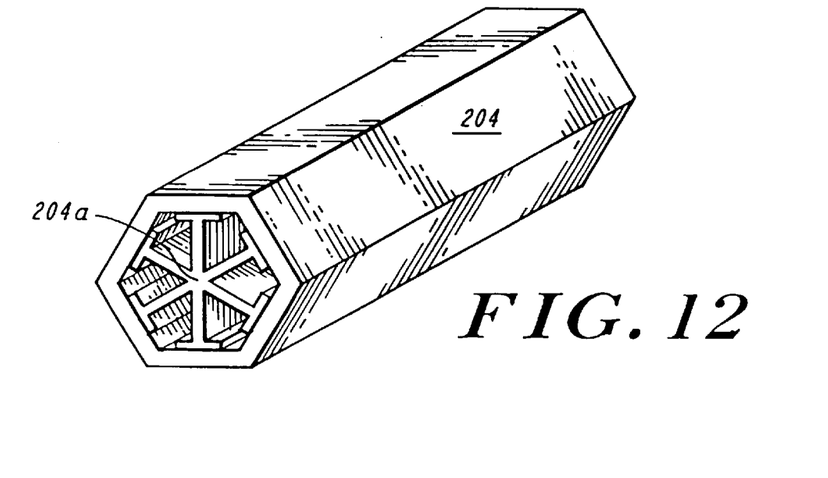

The hexagonal composite member 204 of FIG. 12 has a regular hexagonal cross section and has a multiple-element internal reinforcement member 204a. The illustrated reinforcement member 204a has a transverse cross section as shown, configured with six radially extending spoke-like reinforcement elements uniformly spaced around the circumference and each joined at its radially outer end to the midpoint of one wall of the member 204. Further, the radial elements are joined together at their intersection, at the midpoint or axial center of the composite member 204.

The composite member 204 of FIG. 12 can, for example, be the shaft of a lacrosse stick, and each composite member 200, 202 of FIGS. 10 and 11 can be incorporated in the shaft of a hockey stick.

Figure 13:
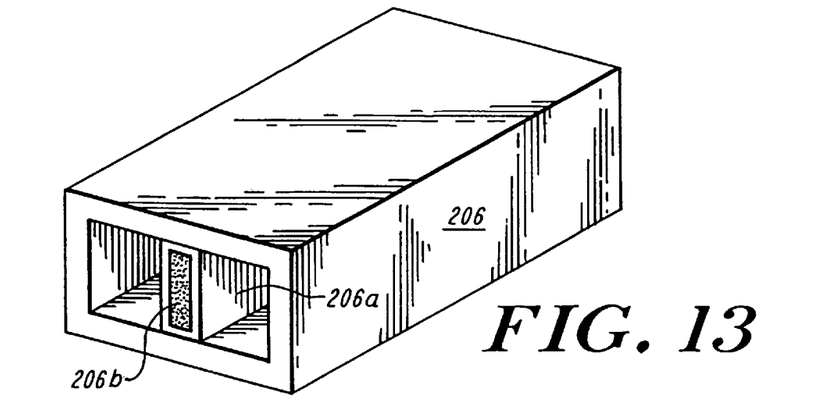

As a farther feature of the invention, a tubular composite member can have an internal reinforcing element that is a foam-filled tubular core. FIG. 13 illustrates this practice of the invention with a tubular composite member 206 that is internally reinforced with a tubular core element 206a, the internal hollow of which is filled with an expanded polymer resin foam 206b.

Figure 14:
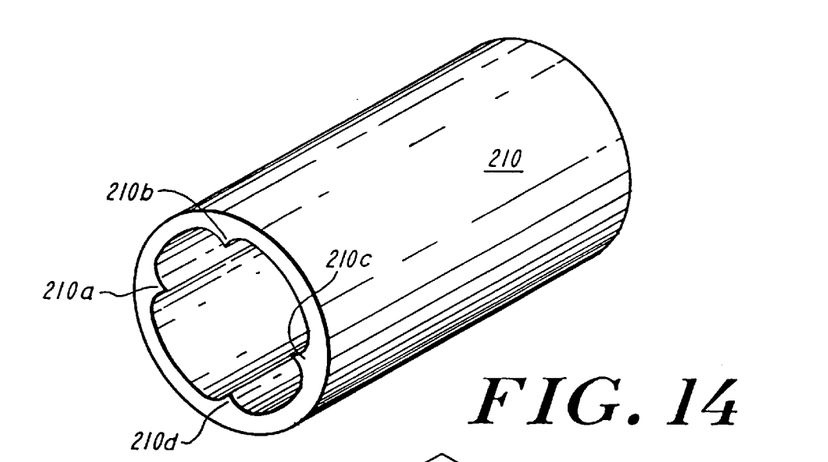

Alternative to an internal reinforcing element that spans fully between opposed walls or wall sections of a tubular element, FIG. 14 illustrates a practice of the invention with a tubular composite member 210, illustratively circular in cross section, and formed as in a pultrusion process, as described in U.S. Pat. No. 5,549,947, with one or more selectively circumferentially located internal ribs. The illustrated member 210 has four such ribs, 210a, 210b, 210c and 210d, equally spaced about the circumference of the circular cross section. This practice in the invention, i.e., with internal reinforcement that extends radially only part way, and not entirely, to an opposing wall portion, can provide added structural rigidity to a composite member, with a higher degree of elasticity than with an internal reinforcement element that spans fully between opposed wall portions, as in each of FIGS. 10, 11, 12 and 13. Further, although illustrated with a composite member of circular cross section, the internal reinforcement illustrated in FIG. 14 can be used with composite members having other configurations, as shown in others of the drawings.

Figure 15:
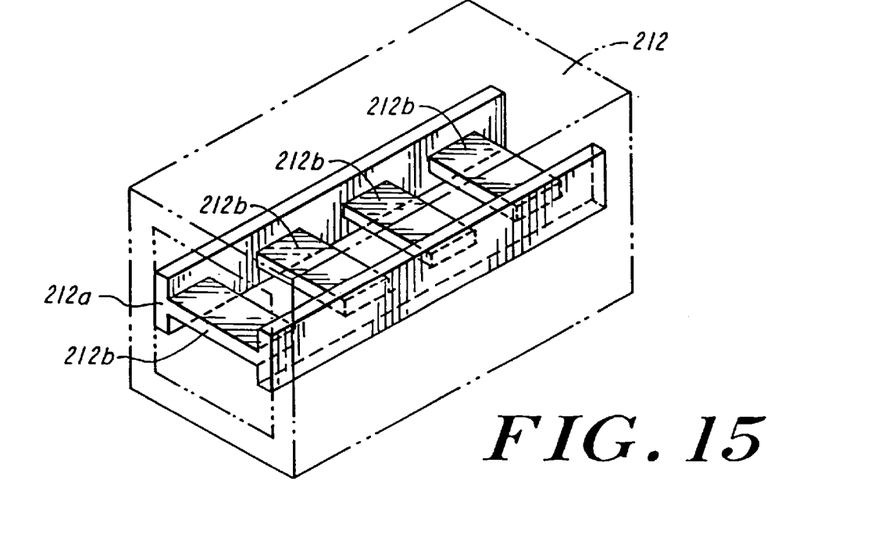

FIG. 15 illustrates a practice of the invention with internal reinforcement of a tubular composite member where the reinforcement is not continuous along the length of the member. In particular, the tubular composite member 212 of FIG. 15 is internally reinforced with an element 212a that is at least partially preformed, e.g., with partial curing of polymer resin and which is finally cured or cured to the final stage after assembly within the composite member. The preformed reinforcement element 212a, as shown, is similar to an I-beam structure having a web spanning between end flanges. However, the web is discontinuous and has only an axially succession of web-like braces 212b that extend diametrically between opposed walls or wall portions of the composite member 212. The discontinuous reinforcing element 212a can be formed as a discontinuous member, or it can be formed as a continuous member which is further processed to remove sections along the reinforcing element. The reinforcing element 212a provides a structure that selectively reduces the total weight of the composite member while providing selective reinforcement to the composite member.

Figure 16:
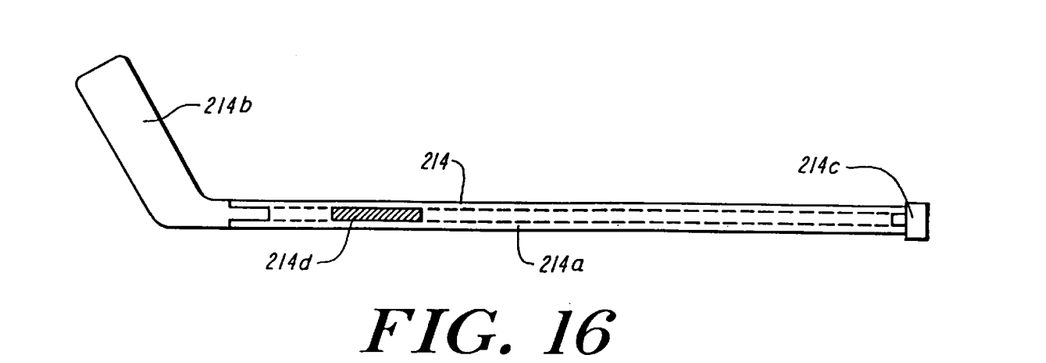
FIGS. 16 and 17 show sports implements, namely, a hockey stick and a lacrosse stick utilizing shafts according to the invention.
Figure 17:
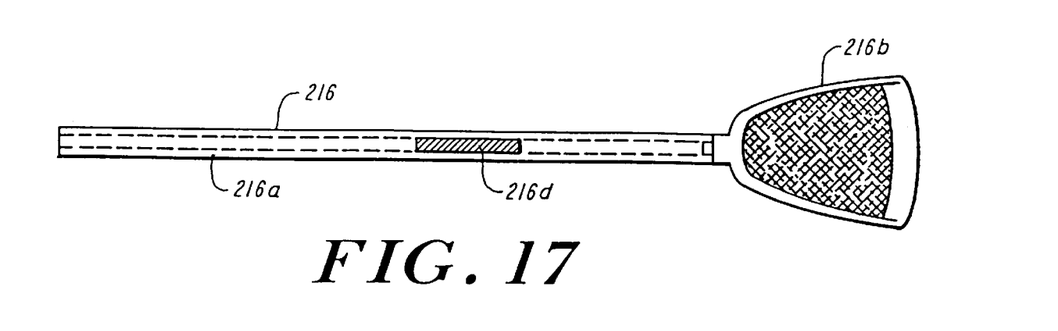

FIGS. 16 and 17, respectively, illustrate a hockey stick 214 and a lacrosse stick 216, each constructed with a shaft 214a, 216a that is a tubular composite member of the type described above in FIGS. 4 through 15.

In particular, the hockey stick 214 has a conventional blade 214a, secured at a lower end of the shaft 214a, and has a cap 214c secured to the upper other end of the shaft 214a. The illustrated shaft 214a has internal reinforcement 214d, as described above with reference to any of FIGS. 10, 11, 12, 13, 14 and 15, extending for a portion only of the length of the shaft.

Similarly, the lacrosse stick 216 of FIG. 17 has a conventional lacrosse net 216b secured to one end of a lacrosse handle shaft 216a. The shaft has an internal reinforcement element 216d extending at least along the lower portion, i.e., the portion to which the net 216b is secured.

Each shaft 214A and 216B thus is axially elongated with a handle portion at one end. At the other end, the shaft has a socket-like receptacle or other structure for seating and thereby mounting a sports implement. This implement is the hockey blade 214A in the embodiment of FIG. 16 and is the lacrosse net 216B in the embodiment of FIG. 17.

It will thus be seen that the invention attains the objects set forth above, among those made apparent from the preceding description, and since certain changes may be made in carrying out the above method and in the articles set forth without departing from the scope of the invention, it is intended that all matter contained in the above description or shown in the accompanying drawings be interpreted as illustrative and not in a limiting sense.

It is also to be understood that the following claims are intended to cover all generic and specific features of the invention described herein, and all statements of the scope of the invention which, as a matter of language, might be said to fall therebetween.

Having described the invention, what is claimed as new and secured by letters patent is:

1. An axially extending tubular composite member having a plurality of plies and having primary bending stiffness along a longitudinal axis, said member having the improvement comprising    A. at least one interior ply having at least a biaxial fiber component with a matrix material,    B. at least one intermediate ply having at least one axially extending fiber component disposed within said matrix material, said intermediate ply being exterior to said interior ply, and    C. at least one exterior ply having a woven fiber component with threads oriented parallel to said longitudinal axis and threads oriented transverse to said longitudinal axis, and disposed with said matrix material, said exterior ply being exterior to said intermediate ply.

2. A tubular composite member according to claim 1 having the further improvement comprising a veil covering said exterior ply, said veil including said matrix material.

3. A tubular composite member according to claim I having the further improvement comprising    at least one outer ply having at least a biaxial fiber component disposed with said matrix material and located between said intermediate ply and said exterior ply.

4. A tubular composite member according to claim 1 wherein said fiber component of said intermediate ply includes a first axial fiber and second and third fibers each oriented diagonally relative to said first fiber, so that said first, second, and third fibers together form a triaxial fiber component.

5. A tubular member according to claim 1 further comprising an internal web-like reinforcement spanning across the tubular interior of the member between and secured to two spaced apart wall portions.

6. A tubular member according to claim 5 wherein said web-like reinforcement includes a fiber component disposed with said matrix material.

7. A tubular member according to claim 5 wherein said web-like reinforcement includes a substantially rigid core disposed between fibers disposed with said matrix material.

8. A tubular member according to claim 1 wherein said member has a cross section transverse to said longitudinal axis in the form of a closed plane figure having at least four sides, and with at least two opposed wall portions.

9. A tubular member according to claim 8 having the further improvement wherein said two opposed wall portions have a first medial thickness and have a greater thickness than said first thickness at longitudinally-extending edges thereof.

10. A tubular member according to claim 8 having the further improvement wherein said member has a lesser wall thickness at the middle of said two opposed wall portions then at axially-extending edges of said opposed wall portions.

11. A tubular member according to claim 8 wherein said two opposed wall portions are symmetrically concave.

12. A composite member according to claim 1 wherein the fiber materials of said biaxial fiber component and of said axial fiber component are selected from the group of fiber materials consisting of polyester, glass, carbon, aramid, and mixtures thereof.

13. An axially extending tubular composite member having a plurality of plies and having primary bending stiffness along a longitudinal axis, said member having the improvement comprising A. at least one interior ply having at least a biaxial fiber component with a matrix material, B. at least one intermediate ply having at least an axial fiber component disposed with said matrix material, said intermediate ply being exterior to said interior ply, C. at least one outer ply having at least any one of (i) a biaxial fiber component and (ii) an axial fiber component, said fiber component being disposed with said matrix material and said outer ply being exterior to said intermediate ply, and D. an internal web-like reinforcement spanning across the tubular interior of the member between and secured to two spaced apart wall portions.

14. A tubular composite member according to claim 13 having the further improvement comprising a further ply exterior to said outer ply and having a woven fiber component.

15. A tubular composite member according to claim 13 having the further improvement comprising a surface veil coating at least one of the inner surfaces of said interior ply and the outer surfaces of said exterior ply.

16. An axially extending composite tubular member having a plurality of plies and having primary bending stiffness along a longitudinal axis, and comprising at least one interior ply having a matrix material and a first fiber component with fibers oriented at an angle relative to said longitudinal axis of between thirty degrees and sixty degrees, and more particularly between forty degrees and fifty degrees, and an internal weblike reinforcement spanning across the tubular interior of the member between and secured to two spaced apart wall portions, said first fiber component being structured to provide significant torsional stiffness to the composite member and said internal weblike reinforcement being structured to provide significant impact resistance to the composite member.

17. An axially extending tubular composite member having a plurality of plies and having primary bending stiffness along a longitudinal axis, said member having the improvement comprising A. at least one interior ply having at least a biaxial fiber component with a matrix material, B. at least one intermediate ply having at least one axially extending fiber component disposed within said matrix material, said intermediate ply being exterior to said interior ply, and C. at least one exterior ply having at least a biaxial fiber component disposed with said matrix material, said exterior ply being located exterior to said intermediate ply.

* * * * *

UNITED STATES PATENT AND TRADEMARK OFFICE
CERTIFICATE OF CORRECTION

PATENT NO.   : 5,888,601
DATED        : March 30, 1999
INVENTOR(S)  : Peter A. Quigley and Stephen C. Nolet It is certified that error appears in the above-identified patent and that said Letters Patent is hereby corrected as shown below:

On the Title Page, under Related U.S. Application Data, please correct the continuing data as follows:

On line 3, after "5,549,947" add --Provisional Application Ser. No. 60/001,470, 07/17/95, --

Signed and Sealed this

Eleventh Day of January, 2000

Attest:

Attesting Officer

Q. TODD DICKINSON

Acting Commissioner of Patents and Trademarks

UNITED STATES PATENT AND TRADEMARK OFFICE
CERTIFICATE OF CORRECTION

PATENT NO. : 5,888,601
DATED : March 30, 1999
INVENTOR(S) : Quigley et al.

It is certified that error appears in the above-identified patent and that said Letters Patent is hereby corrected as shown below:

Col. 1, line 50, after "methods", insert -- of --
Col. 2, line 32, delete "Attachment A", and insert -- U.S. Pat. No. 5,549,947 --
Col. 4, line 38, delete "5,549,997", and insert -- 5,549,947 --
Col. 5, line 25, delete "I00", and insert -- 100 --
Col. 7, line 28, delete "Attachment A", and insert -- U.S. Pat. No. 5,549,947 --
Col. 8, line 36, delete "Attachment A", and insert -- U.S. Pat. No. 5,549,947 --
Col. 9, line 28, delete "farther", and insert -- further --
Col. 10, line 62, delete "I", and insert -- 1 --

Signed and Sealed this

Fourth Day of April, 2000

Attest:

Attesting Officer

Q. TODD DICKINSON

Director of Patents and Trademarks

UNITED STATES PATENT AND TRADEMARK OFFICE
CERTIFICATE OF CORRECTION

PATENT NO. : 5,888,601
DATED : March 30, 1999
INVENTOR(S) : Peter A. Quigley, et al It is certified that error appears in the above-indentified patent and that said Letters Patent is hereby corrected as shown below:

On the Title Page, under Related U.S. Application Data, please correct the continuing data as follows:

line 4, after "571" delete the following:
", and Ser. No. 680,349, Jul. 15, 1996, Pat. No. 5,888,601".

Signed and Sealed this

Eighth Day of August, 2000

Attest:

Q. TODD DICKINSON

*Attesting Officer*   *Director of Patents and Trademarks*